H. N. LEE.
AUTOMOBILE LOCK.
APPLICATION FILED APR. 28, 1920.
1,390,913.
Patented Sept. 13, 1921.
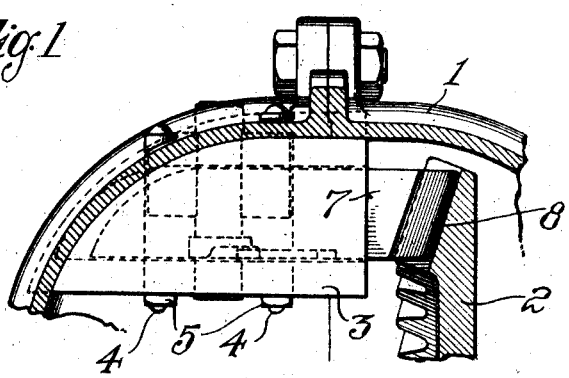
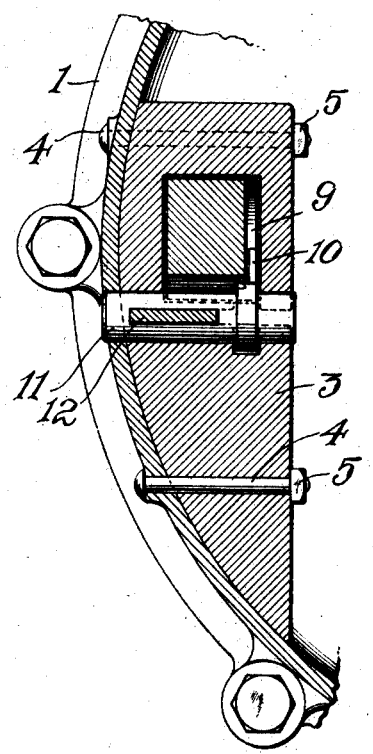
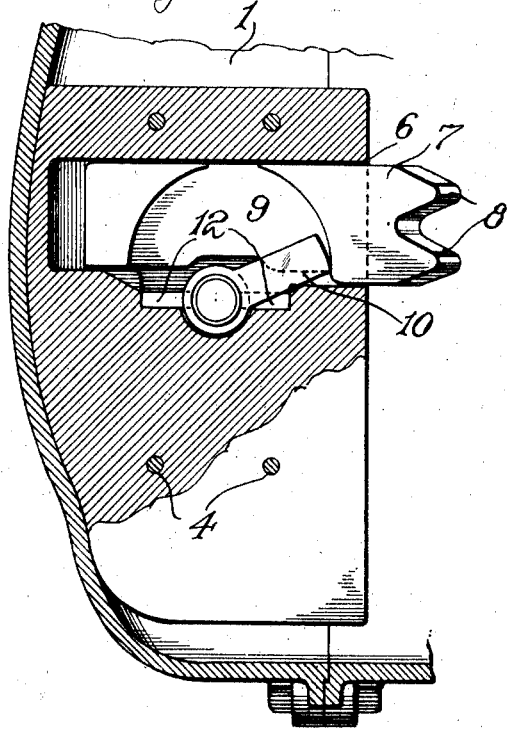
Inventor
Harry N. Lee
By Fetherstonhaugh & Co.
Attorney

UNITED STATES PATENT OFFICE.

HARRY N. LEE, OF CRESTON, IOWA.

AUTOMOBILE-LOCK.

1,390,913.                    Specification of Letters Patent.    Patented Sept. 13, 1921.

Application filed April 28, 1920. Serial No. 377,286.

*To all whom it may concern:*

Be it known that I, HARRY N. LEE, a citizen of the United States, residing at Creston, in the county of Union and State of Iowa, have invented a new and useful Improvement in Automobile-Locks, of which the following is a specification.

This invention relates generally to locking devices for motor vehicles, and has particular reference to a locking device for the differential gearing of such vehicles.

The principal object of the invention is to provide an efficient and easily operated lock of the aforesaid character which can be conveniently installed in the differential case of a motor vehicle without requiring modifications in the construction of the case or in the arrangement of the inclosed gearing.

Briefly stated, the invention may be said to consist of a suitable carrier or body portion for the lock mechanism secured within the differential case in proximity to the main or ring gear of the differential gearing. The lock mechanism is operable from the outside of the differential case by the insertion of a suitable key and includes a throwing arm engaging a sliding bolt member to move the latter into or out of engagement with the teeth of the main or ring gear of the differential gearing. In the projected position thereof, the bolt member holds the said main or ring gear stationary thereby locking the rear drive wheels of the vehicle against rotation and preventing unauthorized operation of the vehicle.

For a more detailed description reference will now be had to the following description and accompanying drawings disclosing one embodiment of the invention.

In the drawings:

Figure 1 is a fragmentary sectional view of a differential case showing the arrangement of the main or ring gear and an end view of my improved lock as it will appear mounted in said case.

Fig. 2 is a vertical sectional view taken longitudinally through the body of the lock and through the gear case.

Fig. 3 is a bottom plan view of the lock in applied position, a portion of the lock body being broken away to show the arrangement of the sliding bolt and the gear casing being in section.

In these drawings, the numeral 1 designates the differential case of a motor vehicle and 2 the main or rear gear of the inclosed gearing.

While I have elected in the present instance to show the differential case and the main or ring gear as being of the Ford automobile type, it is to be understood that my invention is not limited in its application to this particular make of motor vehicle, as it is obvious that the invention is such as to be capable of application to motor vehicles generally and is susceptible of the necessary modifications required to adapt it for use with different types of differential casings and different arrangements of differential gearing, as the latter are illustrated by the various types of motor vehicles now on the market.

In the embodiment herein disclosed, the lock includes a block-like body portion 3 preferably of drop forged steel. The said body portion is arranged within the differential case as indicated in Fig. 1, the upper side of the body being curved longitudinally and transversely to conform to the inner curved wall of the differential case with which it is held in contact by the bolts 4. The bolts 4 are preferably arranged in pairs as shown to extend inwardly through the wall of the differential case and through opposite end portions of the block, suitable nuts 5 being threaded onto the free ends of the bolts and engaged with the lower side of the body 3 to hold the said body in the position shown. For additional securement the body 3 may be electrically welded to the case if desired. As more clearly shown in Figs. 1 and 3, the body portion 3 is formed or provided with a transverse bolt receiving passage 6 opening into the side of the block disposed adjacent to the gear 2. A sliding bolt 7 is arranged for sliding movement in this passage and the outer end of the said bolt is formed to provide teeth 8, which in the projected position of the bolt, mesh with the teeth of the gear 2, as shown to advantage in Fig. 1, and serve to hold the said gear stationary. It will be noted here that the toothed end of the bolt is beveled inwardly from the upper to the lower side thereof so as to properly engage with the inclined teeth of the gear.

The underside of the bolt is cut out to provide a semi-circular recess 9 receiving the free end of a swinging throwing arm 10. The throwing arm 10 is carried by the mechanism of a suitable lock barrel 11, which, as shown in the different figures, extends through the body 3 at right angles to the locking bolt 7. As shown to advantage in Fig. 3, the upper end of the lock barrel extends outwardly through the wall of the differential case, and, as is usual with lock barrels of this type, is provided with a key slot through which the proper key may be inserted to actuate the swinging arm 10, which latter arm operates against the curved wall of the recess 9, to move the bolt 7 to projected or retracted position, with respect to the body 3 according to the direction in which the throwing arm is turned.

To relieve the bolts 4 of the entire strain of the locking mechanism the lock barrel 11 is provided with oppositely directed side wings 12 which are received in suitable cut outs provided therefor in that portion of the body 3 immediately surrounding the barrel.

Normally, the lock bolt 7 is retracted within the body portion 3, but when it is desired to lock the vehicle against unauthorized operation, the proper key is inserted in the outer end of the lock barrel 11 to swing the arm 10 of the locking mechanism in a direction to force the teeth 8 of the locking bolt 7 into engagement with the main or ring gear 2, thus holding the said gear stationary, and preventing rotation of the rear drive wheels of the vehicle. The locking mechanism within the barrel 11 should be such that the key may be conveniently removed from the barrel after each actuation of the throwing arm 10, thus leaving the said arm locked in either a bolt retracting or projecting position, as the case may be.

Having thus fully described my invention, what I claim is:

1. A differential gear lock comprising a solid body having a transversely and longitudinally curved upper surface adapting the body to be secured in the differential case in close proximity to the main or ring gear, said body being formed with a transverse bolt passage adapted to be disposed opposite the ring gear and with a bore extending therethrough at right angles to said passage in communication with the latter, a bolt slidable in said passage provided on the under side thereof with a semi-circular recess communicating with said bore, and on the outer end thereof with inclined teeth engageable with the bevel teeth of the ring gear, a lock barrel mounted in said bore and a swinging arm carried by the barrel and engaged in the recess in said bolt.

2. The combination with an apertured differential gear case, and the inclosed main or ring gear, of a block secured in said case opposite and in close proximity to said gear, said block being formed with a longitudinally and transversely curved upper surface to conform to the shape of the gear case and being provided with a transverse bolt passage and with a bore extending therethrough at right angles to said bolt passage and in communication therewith, a bolt slidable in said passage having the outer end thereof provided with bevel teeth engageable with the bevel teeth of the ring gear, a lock barrel mounted in said bore with the upper end of the aperture projecting outwardly through the aperture in said casing, and a swinging key controlled arm carried by the barrel at one end thereof and engageable with said bolt to move the latter into or out of engagement with the ring gear.

HARRY N. LEE.